(12) United States Patent
Sarais et al.

(10) Patent No.: US 10,574,593 B2
(45) Date of Patent: Feb. 25, 2020

(54) MEDIAN FILTER THAT RE-USES COMPARATORS WHEN SORTING DATA

(71) Applicant: Infineon Technologies AG, Neubiberg (DE)

(72) Inventors: Pantelis Sarais, Villach (AT); Peter Singerl, Villach (AT)

(73) Assignee: Infineon Technologies AG, Neubiberg (DE)

( * ) Notice: Subject to any disclaimer, the term of this patent is extended or adjusted under 35 U.S.C. 154(b) by 412 days.

(21) Appl. No.: 15/491,442

(22) Filed: Apr. 19, 2017

(65) Prior Publication Data

US 2018/0309697 A1    Oct. 25, 2018

(51) Int. Cl.
*H04L 12/933*   (2013.01)
*H04L 12/937*   (2013.01)
*H04W 52/02*    (2009.01)

(52) U.S. Cl.
CPC ........ *H04L 49/1507* (2013.01); *H04L 49/254* (2013.01); *H04W 52/0203* (2013.01)

(58) Field of Classification Search
CPC combination set(s) only.
See application file for complete search history.

(56) References Cited

U.S. PATENT DOCUMENTS 5,265,260 A      11/1993  Hendricks
5,862,064 A  *   1/1999   Bae .................... H03H 17/0263
                                                            708/304
5,968,111 A  *   10/1999  Bae .................... H03H 17/0263
                                                            708/202
2008/0016134 A1* 1/2008   Klima .................... G06F 7/544
                                                            708/202
2014/0189292 A1* 7/2014   Ioffe .................... G06F 9/30036
                                                             712/7
2018/0260422 A1* 9/2018   Bethmann ......... G06F 16/24568

OTHER PUBLICATIONS

Cormen, Thomas H. et al., "Sorting Networks", Introduction to Algorithms, Second Edition, The MIT Press, 2001, pp. 704-724.
Mueller, Rene et al., "Data Processing on FPGAs", Proceedings of the VLDB Endowment, vol. 2, issue 1, Aug. 2009, pp. 910-921.
Mueller, Rene et al., "Sorting Networks on FPGAs", The VLDB Journal, Feb. 2012, vol. 21, Issue 1, First Online Jun. 2011, pp. 1-23.

(Continued)

*Primary Examiner* — Hicham B Foud
(74) *Attorney, Agent, or Firm* — Murphy, Bilak & Homiller, PLLC

(57) ABSTRACT

Techniques are provided for sorting input data values using a sorting circuit. The sorting circuit includes a single stage of comparators coupled to a bank of registers. Multiplexors and a sequencer are used to route the comparator outputs back to the comparator inputs such that the comparators may be re-used over multiple sorting phases so as to order an input sequence of data values into a partially-sorted sequence or into a completely-sorted sequence that is monotonically increasing or decreasing. By re-using the comparators, the hardware required for such sorting is significantly reduced relative to conventional techniques. Also described are techniques for median filtering, which use a sorted sequence as output by the sorting circuit described herein.

19 Claims, 9 Drawing Sheets

(56) References Cited

OTHER PUBLICATIONS

Oflazer, Kemal, "Design and Implementation of a Single-Chip 1-D Median Filter", Carnegie Mellon University, Research Showcase @ CMU, Computer Science Department, Apr. 1982.
Rabiner, Lawrence R. et al., "Applications of a Nonlinear Smoothing Algorithm to Speech Processing", IEEE Transactions on Acoustics, Speech, and Signal Processing, vol. 23, No. 6, Dec. 1975, pp. 552-557.
Knuth, Donald E., "Networks for Sorting", The Art of Computer Programming, vol. 3 Sorting and Searching, 2nd ed., Jan. 1, 1998, pp. 1-36.

\* cited by examiner

MEDIAN FILTER THAT RE-USES COMPARATORS WHEN SORTING DATA

TECHNICAL FIELD

The present application relates to median filters and, in particular, relates to techniques for sorting input data samples, wherein a bank of comparators is re-used over multiple phases to perform the sorting.

BACKGROUND

In signal processing, median filtering provides a nonlinear signal smoothing operation which may be used for noise reduction. In data processing, median filtering is used for smoothing and related data analysis tasks. Median filtering is characterized in its ability to smooth a data sequence, thereby reducing or eliminating noise, while preserving discontinuities in the data sequence. The preservation of discontinuities or other sharp changes in a data sequence presents an advantage over linear filters, such as linear low-pass filters, which tend to smooth out such changes. Median filtering is, therefore, useful in applications such as sensor reading. For example, a median filter applied to the readings from a current sensor may remove or reduce noise in the current readings, but still be able to quickly and effectively detect overcurrent conditions associated with a current transient or similar event.

Median filtering requires the sorting of input data samples into an ordered or partially-ordered sequence. Hardware implementations of median filters typically use a sorting network based upon multiple stages of comparators, wherein each stage includes multiple comparators. In an asynchronous implementation of such a sorting network, each stage of comparators directly couples to and feeds the next stage of comparators. In a pipelined (synchronous) implementation of such a sorting network, the comparator stages are separated by registers that latch the comparator outputs from each stage, in order to feed the comparator inputs of the subsequent stage. Regardless of whether the sorting network uses an asynchronous or pipelined (synchronous) circuit, such sorting networks require multiple stages wherein each stage includes multiple comparators.

Consider a sorting network, which may be part of a median filter or not, operating over w samples of an input data sequence, wherein w represents a window size and is a multiple of 2 such that $w=2^p$. As explained in R. Mueller et al., "Sorting networks on FPGAs," *The VLDB Journal*, February 2012, Volume 21, Issue 1, pp 1-23, an even-odd merging network may be used to implement such a sorting network and uses S stages and C comparators, wherein:

$$C(2^p) = (p^2 - p + 4)2^{(p-2)} - 1, \quad (1)$$

$$S(2^p) = \frac{p(p+1)}{2}. \quad (2)$$

A median filter operating over an even number of input samples, as given by $w=2^p$, may not require the complete sorting of the input data into a monotonically increasing (or decreasing) sequence, as the median filter might only require the identification of the two input data values in the middle of a sorted sequence. In other words, the comparative ordering of these two values may not be needed. By taking advantage of this, a median filter may use a sorting network having one fewer stages than given in equation (2), and p fewer comparators than given in equation (1).

The comparators make up a significant portion, and often a majority, of the die area required in a hardware implementation of a sorting network or a median filter that includes such a sorting network. Table 1 provides the number of stages and comparators that are required by an even-odd merging network that performs a complete sorting of an input sequence having a window size of w, as calculated using equations (1) and (2). Also shown are the number of stages and the number of comparators required by a median filter that is able to omit the last stage of the complete sorting.

TABLE 1

Required number of stages and number of comparators for a sorting network

| Window size w | $p = \log_2(w)$ | Complete sorting | | Median filter with incomplete sorting | |
|---|---|---|---|---|---|
| | | Stages | Comparators | Stages | Comparators |
| 4 | 2 | 3 | 5 | 1 | 3 |
| 8 | 3 | 6 | 19 | 2 | 16 |
| 16 | 4 | 10 | 63 | 3 | 59 |
| 32 | 5 | 15 | 191 | 4 | 186 |

In addition to the comparators consuming a large amount of die area for any even-odd merging network, equation (1) and Table 1 show that the number of comparators increases exponentially as the input window size increases.

To quickly sort or filter input data and to minimize power consumption, hardware implementations of sorting networks and median filters are often preferred. This is particularly true when processing large amounts of input data, or when input data is being generated, and must be processed, at a high rate. However, the number of comparators required by such hardware implementations may lead to die area requirements that are unacceptably large for some applications, and may even make median filtering unfeasible for some applications. Such applications may opt for linear filters and their associated inferior performance, rather than incurring the cost and die size associated with median filtering.

SUMMARY

According to an embodiment of a sorting circuit, the sorting circuit sorts input data values to produce a median value. The sorting circuit includes a plurality of comparators, a plurality of multiplexors, and a scheduling circuit. Each of the comparators is operable to compare two input data values, and produce a minimum of the two input data values at a first comparator output and a maximum of the two comparator data values at a second comparator output. Each of the multiplexors has a plurality of multiplexor data inputs, wherein each multiplexor data input is coupled to an output of one of the comparators or to one of the input data values. This coupling may be indirect. For example, a register may be coupled to each comparator output and provide the data values to the multiplexor data inputs. Each multiplexor has an output that is coupled to an input of one of the comparators. Each multiplexor further includes a selection input that determines which of the multiplexor data inputs is routed to the multiplexor output, and the comparator input coupled thereto. The scheduling circuit is configured to generate control signals that are coupled to the multiplexor selection inputs for each of the plurality of multiplexors. The control signals generated by the scheduling circuit determine which comparator outputs or input data values, for a current sorting phase, are routed to comparator inputs for a next sorting phase. The control signals are updated for each of multiple phases, and are generated so as to implement a known sorting algorithm. After the multiple phases are complete, a sorted or partially-sorted sequence of output values, including a median value, is produced.

According to an embodiment of a method, input data values are sorted within a sorting circuit comprised of a plurality of comparators, a plurality of multiplexors, and a sequencer. The method begins with inputting a sequence of input data values. For a first phase of the method, control signals are generated, wherein the control signals are coupled to multiplexor selection inputs for each of the plurality of multiplexors. Next, each of the multiplexors routes a selected multiplexor data input to a multiplexor output based upon the selection input for that multiplexor. Each of the multiplexor inputs is coupled to one of the input data values or to an output from one of the comparators. Each of the multiplexor outputs is coupled to a comparator input. With the multiplexors routed thusly, each comparator compares two data values provided at its inputs, and produces a minimum of these data values at a first (minimum) comparator output and a maximum of these data values at a second (maximum) comparator output. These comparator outputs are then provided, typically via latched registers, to the multiplexor inputs in preparation for a subsequent phase. The generating of control signals, routing of data values through the multiplexors, comparing of data values, and providing of ordered pairs of data values is repeated for each of multiple sorting phases, wherein each phase partially sorts the data values provided by the previous phase. After a final phase, a partially or completely-sorted sequence of the input data values is produced, including a median value.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments may be combined unless they exclude each other. Embodiments are depicted in the drawings and are detailed in the description that follows.

DETAILED DESCRIPTION

Figure 1:
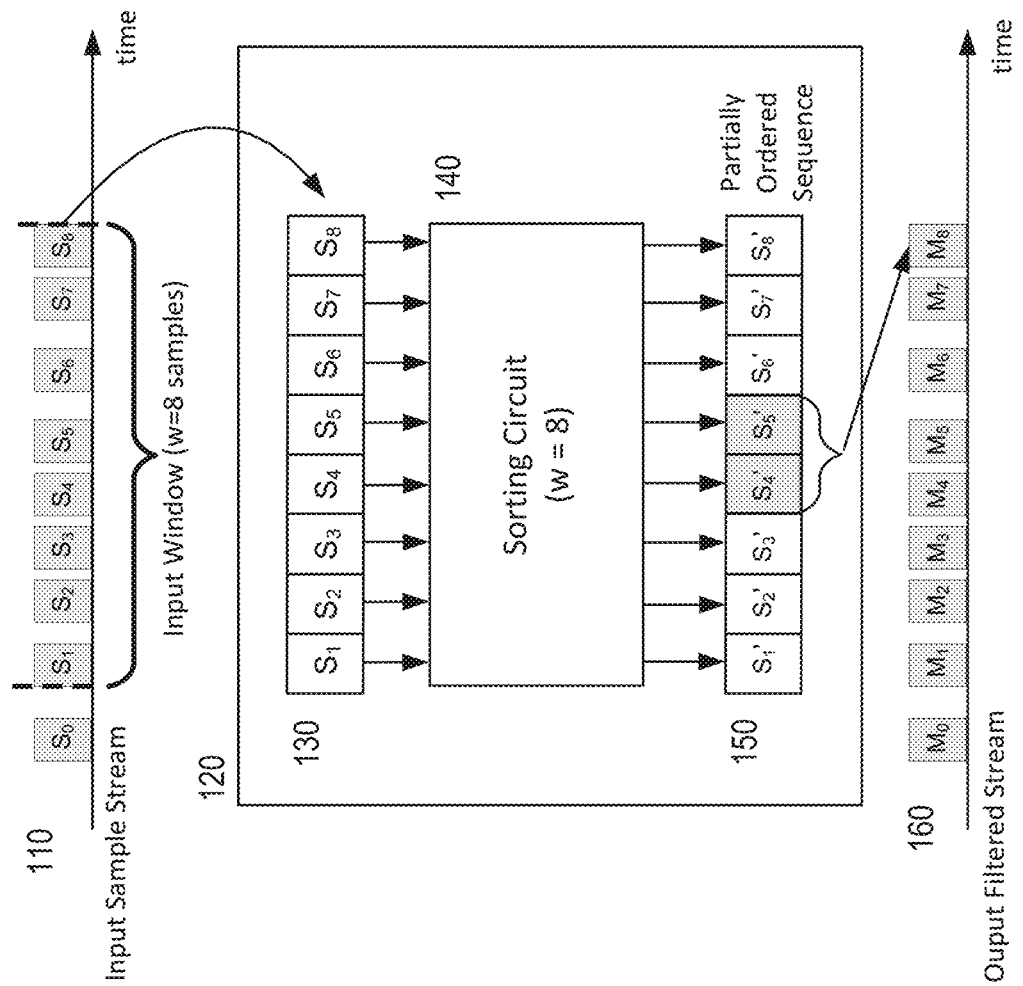
FIG. 1 illustrates a high-level diagram of a median filter including a sorting circuit.

A conventional even-odd merging network provides a quick and effective technique for sorting a sequence of input data values, but requires a large number of comparators spread over multiple sorting stages. The embodiments described herein provide techniques wherein the number of comparators is significantly reduced, relative to known techniques, by re-using a single stage of comparators. Multiplexors, registers, and a scheduler are used to route data to and from the comparators over multiple sorting phases, so as to sort the sequence of input data values. The number of comparators is reduced to w/2 for an input window size of w data samples where w is even. (For ease of explanation, w is assumed to be even within many of the descriptions herein, but the techniques are similarly applicable to an odd number of data samples. For an odd number of data samples, $$\frac{w+1}{2}$$

comparators are used.) The number of required registers is similarly reduced using the techniques herein, as compared to the number of registers required in a pipelined (synchronous) circuit for implementing the even-odd merging network. For an example case with a window size w=8 (p=3), a conventional multistage pipelined even-odd merging network for sorting an input data sequence would require 19 comparators, 6 stages, and 48 data registers. In order to implement a median filter in which the last sorting stage may be omitted, the merging network could be reduced to 16 comparators, 5 stages, and 40 registers. In contrast to this, the techniques described herein for sorting such an input data sequence to implement a median filter have significantly reduced hardware requirements, e.g., 4 comparators, one comparator stage, and 8 data registers in exemplary embodiments. Furthermore, the hardware requirements, e.g., the number of comparators, increases linearly with an increase in the number of input sequence values, as compared to an exponential increase for a conventional even-odd network.

In a first embodiment, a median filter, including a sorting circuit, is provided. The sorting circuit may be used to completely sort an input sequence of data values so as to produce a monotonically increasing or decreasing output sequence of the data values that are input. Alternatively, the sorting circuit may only partially sort the sequence of input data values. When the primary application is merely to find a median value of the sequence of input data values, it may not be necessary to sort the data values completely into a monotonically increasing (or decreasing) sequence. Notably, a partially-sorted sequence of the input data values is sufficient for median filtering applications.

In sub-embodiments of the first embodiment, the sequence of input data values is provided to the median filter using a shift register. For each new data value shifted into the shift register, the median filter produces a new median output value based upon the values currently in the shift register. In another sub-embodiment, a block of input data values is shifted into the shift register, and one median value is produced by the median filter for the entire block of input data values.

The median filter of the first embodiment includes a comparator stage having a plurality of comparators, a plurality of registers coupled to the comparators, and a plurality of multiplexors for routing the register outputs back to the comparator inputs. The multiplexors are controlled by a sequencer, which determines which values are routed (fed) back to the comparator inputs. The sequencer may generate separate selection control signals for each of the multiplexors, may generate a common selection control signal for the multiplexors, or may generate control signals that control a group of multiplexors. The control signals may be generated by a mod-P counter, or by a more general finite state machine within the sequencer.

For ease and clarity of explanation, specific example embodiments that demonstrate such implementation alternatives are provided herein. It should be appreciated that the examples do not exhaustively describe all variations of the inventions, and that techniques from the various implementations may be combined in ways not explicitly disclosed herein.

In a second embodiment, a method within a sorting circuit is provided. The so g circuit may be the same as the sorting circuit of the first embodiment, or variants thereof.

In a third embodiment, wireless devices and network nodes are provided that make use of median filters, as described herein.

In a fourth embodiment, a data center is provided that makes use of a median filter or the related sorting, as described herein.

FIG. 1 illustrates an embodiment of a median filter 120 including a sorting circuit 140. An input stream 110 of data values (samples) is provided to a shift register 130, such that the shift register 130 stores the last w data values from the input stream 110. The underlying input data could correspond to, for example, readings from a sensor such as a current sensor, or samples of an audio waveform. The input data is sampled and digitized to generate data values $S_0, S_1, \ldots S_8 \ldots$, which are shifted into the shift register 130. The illustrated embodiment shows a shift register 130 that operates over a window size of w=8 samples of the input steam 110. For ease of illustration, only a limited number of input data values are shown, but it should be understood that the input stream is typically not of a fixed length and may be indefinite in length.

The sorting circuit 140 is provided with data values $S_n \ldots S_{n+7}$ from the shift register 130. The sorting circuit 140 sorts the provided data values to produce an ordered list of output data values $S_1', S_2', \ldots S_8'$, wherein the output data values are monotonically increasing such that $S_1' \le S_2' \ldots \le S_8'$, or are partially sorted. The ordered list of output data values may be stored in a set of output registers 150. Typically, for each new data value shifted into the shift register 130, the sorting circuit 140 sorts the data and populates the set of output registers 150 with new output data values corresponding to the input data values currently stored in the shift register 130.

The median filter 120 may be considered to provide a sliding window over the sequence of input data samples 110. For each new input data sample, e.g., $S_8$, that is input to the shift register 130, an oldest input data sample, e.g., $S_0$, is shifted out of the shift register 130. The median filter 120 operates on the input data samples within the shift register 130. In a typical implementation, the median filter 120 provides one output (filtered) data sample, e.g., sample $M_8$, for each input data sample shifted into the shift register 130. In an alternative implementation, the median filter 120 shifts multiple, e.g., 8, input data samples into the shift register 130 at once, and provides one output (filtered) data sample for the block of input data samples. This alternative implementation thereby provides downsampling in addition to the sorting and median filtering.

In order to implement the median filter 120, a median of the output data values $S_1', S_2', \ldots S_8'$, should be produced. Given that there is an even number of input and output data values in the illustrated example, there is no exact midpoint of the ordered output sequence, i.e., the median would correspond to an output data value between S4' and S5'. In the preferred embodiment illustrated, the median is set to an average of the two middlemost samples from the output sequence, e.g., $$M_8 = \frac{S_4' + S_5'}{2}.$$

In alternative embodiments (not illustrated), the lower median $S_4'$ or the upper median $S_5'$ is output as the median for the output sequence. The choice of the upper or lower median $S_4'$, $S_5'$ may be explicitly set a priori, or may be arbitrarily made. For the cases where the average is used or the choice is arbitrarily made, it is not necessary to perform a complete sorting. In other words, it may be known that $S_4'$ and $S_5'$ are the middle values of the ordered sequence, but it is not necessary to know which of these is greater than the other.

Figure 2:
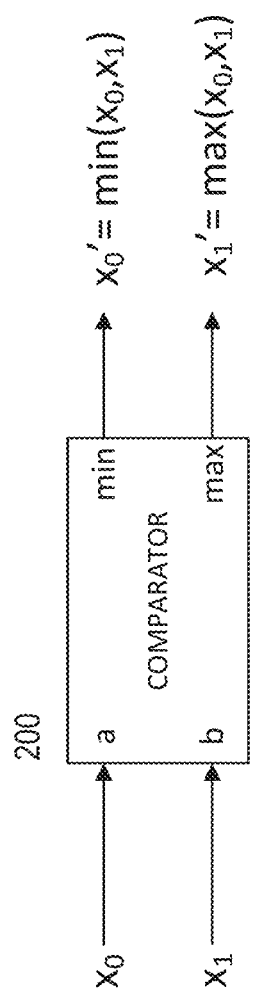
FIG. 2 illustrates a comparator as might be included within a sorting circuit.

FIG. 2 illustrates a comparator 200, which is one of the fundamental components of the sorting circuit 140. The comparator 200 inputs two data values $x_0, x_1$ and determines which of these is a larger value and which is a smaller value. The smaller value, representing the minimum of the inputs $x_0, x_1$ is provided at a first output $x_0'$. The larger value, representing the maximum of the inputs $x_0, x_1$, is provided at a second output $x_1'$ For the exceptional case where the two values are equal, it is not material which value is output as $x_0'$ and which is output as $x_1'$. For example, $x_0'$ could be always set to $x_0$ when the comparator determined that $x_0=x_1$.

Figure 3:
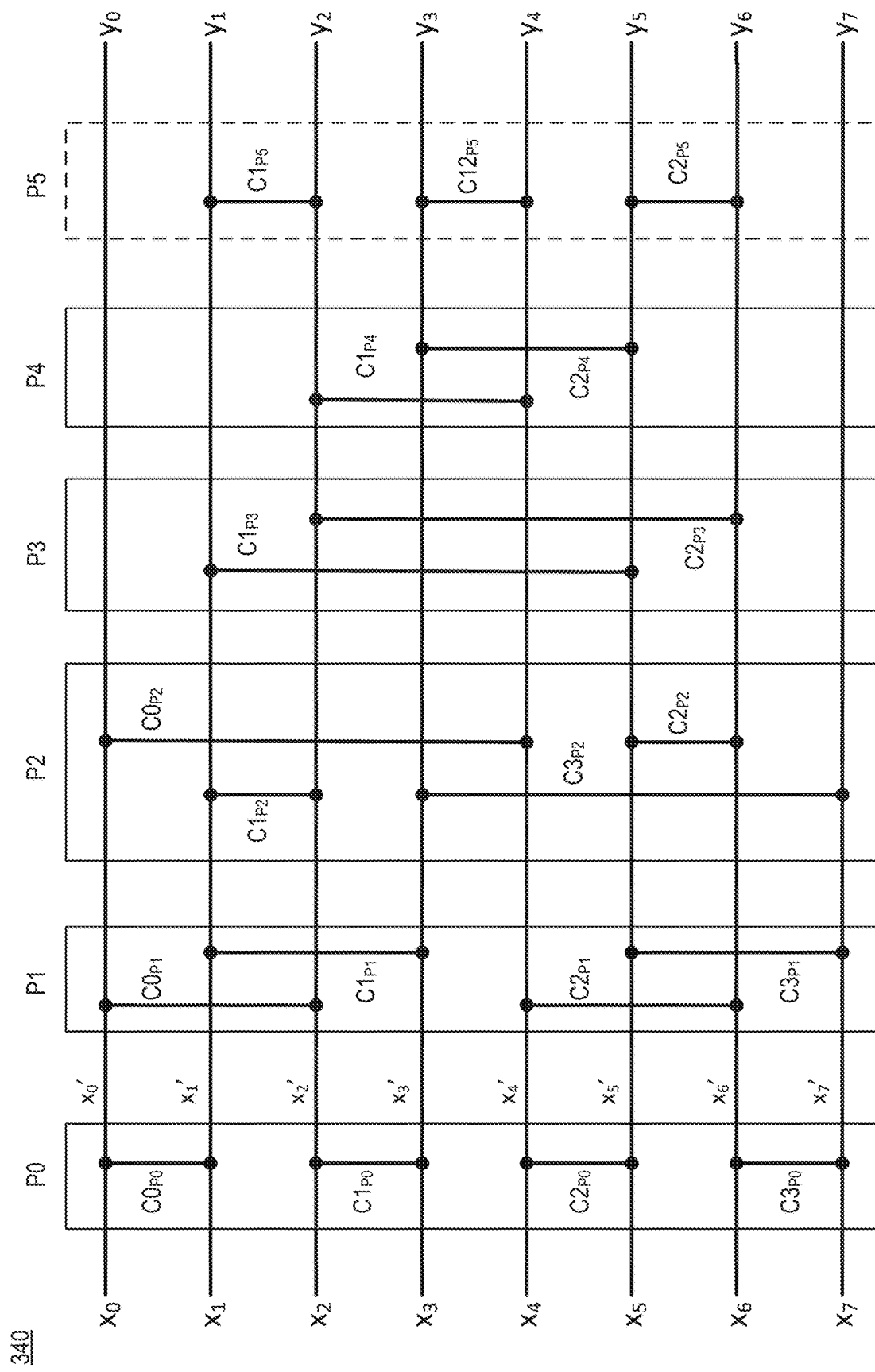
FIG. 3 illustrates an even-odd merging network, as may be used for sorting input data values.

FIG. 3 illustrates an even-odd merge sorting network 340, as might be used to implement the sorting circuit 140 of FIG. 1. Input (unsorted) data values $x_0$ $x_7$ are provided to the sorting network 340, and the sorting network 340 outputs an ordered set of output data values $y_0 \ldots y_7$. The input data values $x_0 \ldots x_7$ may correspond to the samples $S_n \ldots S_{n+7}$ from a shift register, such as the shift register 130 of FIG. 1. Likewise, the ordered set of output values $y_0 \ldots y_7$ may correspond to output data values $S_1', S_2', \ldots S_8'$ of a sorting circuit 140, as illustrated in FIG. 1.

The illustrated even-odd merge network 340 operates on w=8 input data values and provides an ordered set of w=8 output data values. For such a window size of w=8, 6 phases and a total of 19 comparisons are performed to yield the ordered output data values $y_0 \ldots y_7$. At each of the intermediate phases, denoted as P0 $\ldots$ P4, the data is partially sorted. After the last phase P5, the data is completely sorted, such that the output data values are put in a monotonically increasing order, i.e., $y_0 \le y_1 \le \ldots \le y_7$.

For ease of explanation, a few exemplary operations within the even-odd merge network 340 will now be considered. In the initial phase P0, 4 comparisons are performed. The input data values $x_0$ and $x_1$ are compared, and resultant minimum $x_0'$ and maximum $x_1'$ values are produced. This comparison operation is denoted $C0_{P0}$ in FIG. 3. Likewise, a comparison operation $C1_{P0}$ compares data values $x_2$ and $x_3$ and produces a minimum value $x_2'$ and a maximum value $x_3'$. Comparison operation $C2_{P0}$ sorts the data values $x_4$ and $x_5$, and comparison operation $C3_{P0}$ sorts the data values $x_6$ and $x_7$. The initial phase P0 produces a partially sorted data set, wherein pairs of data values are sorted, i.e., $x_0' \le x_1'$, $x_2' \le x_3'$, $x_4' \le x_5'$, $x_6' \le x_7'$.

The subsequent phase P1 also includes 4 comparisons, and operates on the partially sorted data $x_0'$, $x_1'$, $x_2'$, $x_3'$, $x_4'$, $x_5'$, $x_6'$, $x_7'$ provided by the initial phase P0. The phase P1 provides another partial sorting of the data. The phase P2 includes another 4 comparisons and further partially sorts the data provided by the phase P1. Such operations continue for phases P3, P4, and P5 which include, respectively, 2 comparisons, 2 comparisons, and 3 comparisons. The final phase P5 produces a data set that is completely sorted, i.e., $y_0 \le y_1 \le \ldots \le y_7$.

The last phase P5 of the even-odd merge network 340 is illustrated as optional in FIG. 3. As explained previously, a median filter does not require a completely sorted, i.e., monotonically increasing or decreasing, sequence. Hence, phase P5 may be omitted for typical implementations in which the even-odd merge network 340 is used for median filtering. If, however, the sorting network 340 is being used to sort data into a monotonically increasing or decreasing sequence, phase P5, together with its 3 associated comparisons, is included.

The sorting algorithm used by an even-odd merge network, such as the network 340 of FIG. 3, is conventionally implemented in circuitry using multiple comparison stages, each of which uses multiple (hardware) comparators. For such a conventional implementation, the phases P0 . . . P5 in FIG. 3 would actually be stages, and each of the comparison operations $C0_{P0}$ $C3_{P0}$, $C0_{P1}$ . . . $C3_{P1}$, . . . $C1_{P5}$ . . . $C2_{P5}$, would be implemented using a comparator such as the comparator 200 illustrated in FIG. 2. For a complete sorting, such a conventional implementation would require 6 stages and 19 comparators to sort the window of w=8 data values. For an incomplete sorting in which phase P5 is omitted, such a conventional implementation would require 5 stages and 16 comparators.

Figure 4A:
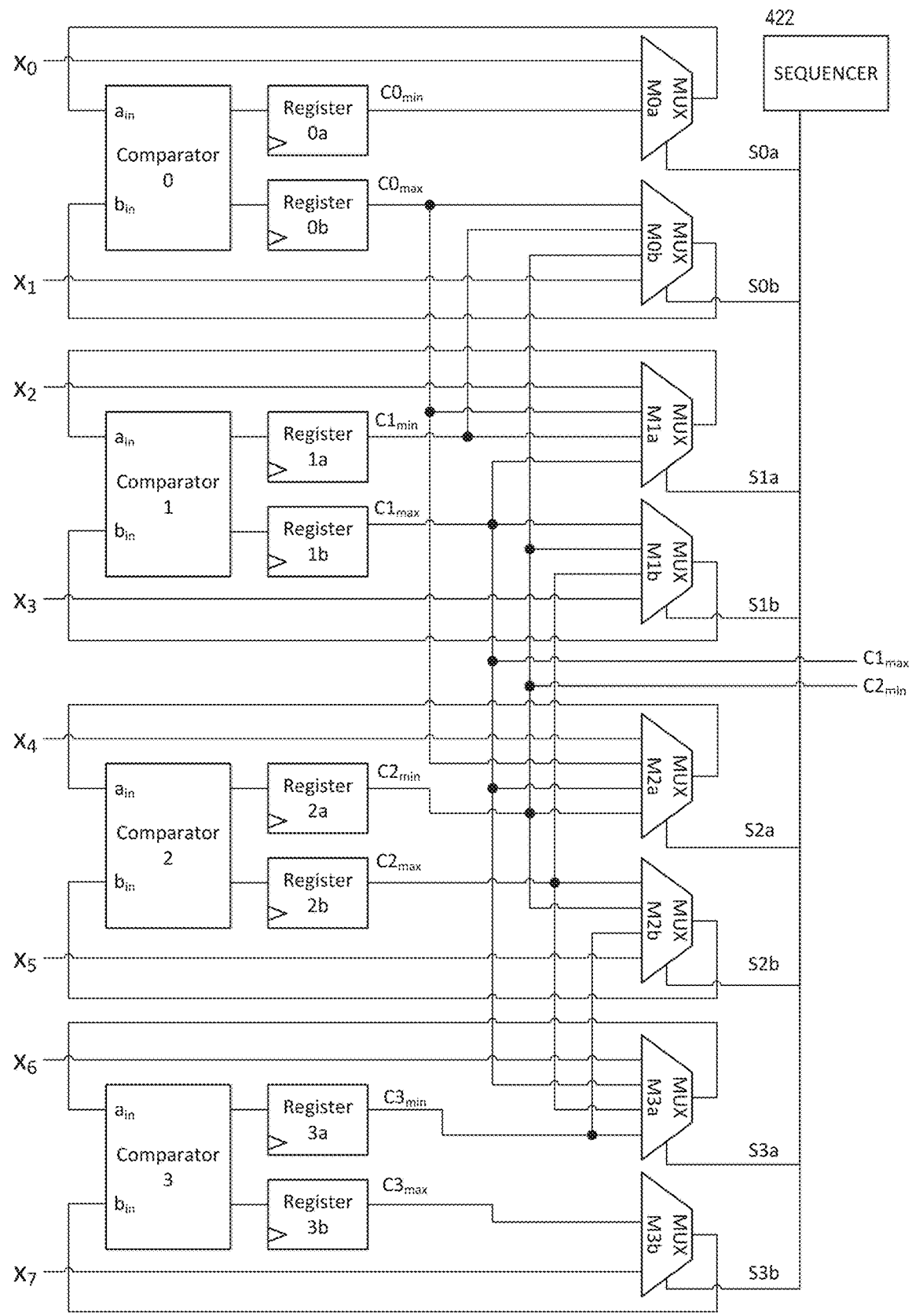
FIGS. 4a and 4b illustrate an embodiment of median filter, including a sorting circuit, that uses a scheduler and multiplexors to re-use comparators during the sorting of input data values.
Figure 4B:
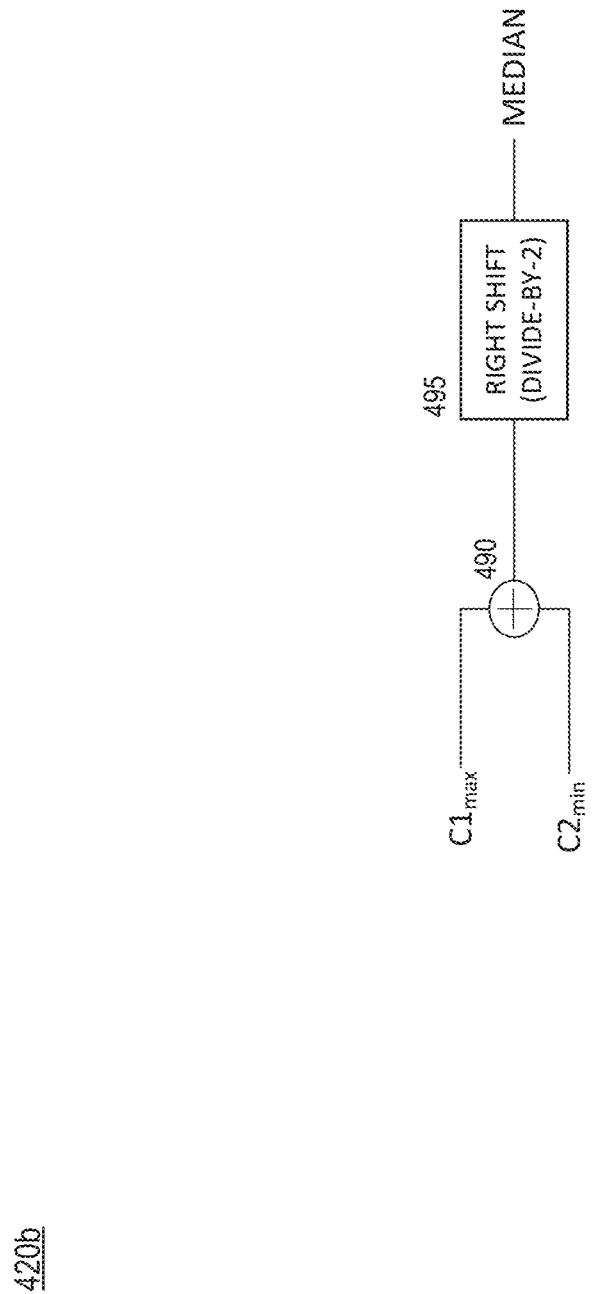

FIGS. 4a and 4b illustrate an embodiment of a median filter 420, which includes circuitry to implement the sorting algorithm used by an even-odd merge network. The illustrated median filter 420, and the description below, presume that the last sorting phase P5 is not performed, i.e., the final output is only partially sorted.

The median filter 420, and its associated sorting circuit 420a, uses a minimal number of comparators by re-using the comparators during multiple phases of a sorting operation. The sorting circuit 420a includes a single stage of comparators, comprised of Comparators 0, 1, 2, 3. The minimum and maximum outputs from each comparator are coupled to registers. For example, the minimum value from Comparator 0 is provided to an input of Register 0a, and the maximum value from Comparator 0 is provided to an input of Register 0b. Registers 1a, 1b, 2a, 2b, 3a, 3b are likewise coupled to each of the Comparators 1, 2, 3.

The data values provided by the comparators to the registers are latched into the registers on a clock edge. (For ease of illustration, the clock signals are not shown.) A common clock may be provided to the registers, such that data is latched into each of the registers simultaneously. Alternatively, separate clock signals may be provided to one or more registers, so that data may be latched into the registers individually, as needed.

Each register provides a data output, shown as $C0_{min}$, $C0_{max}$, $C3_{max}$. Each of these data outputs is provided to one or more multiplexors MUX M0a, MUX M0b, . . . MUX M3b. In the illustrated embodiment of FIG. 4a, these multiplexors each have 4 inputs, except for MUX M0a and MUX $M_3$b, which have only 2 inputs. Each of the multiplexors has its output routed back to a comparator input, $a_{in}$, or $b_{in}$. For example, the output of MUX M0a is coupled to input an of Comparator 0, whereas the output of MUX M0b is coupled to input $b_{in}$ of Comparator 0.

Each multiplexor determines which input to route to its output based upon a select (control) input. Control signals S0a, S0b, . . . S3b are generated by a sequencer 422 and coupled to selection inputs of the multiplexors. The sequencer 422 thus determines the routing for each phase of the sorting circuit 420a. The control signals S0a, S0b, . . . S3b are generated by the sequencer 422 for each of several phases, so as to implement a sorting algorithm, such as that of the even-odd merge network of FIG. 3, using the comparators, registers, and multiplexors of the sorting circuit 420a.

After performing 5 sorting phases, the two middlemost data values from the input sequence $x_0$ . . . $x_7$ will be available at the Register 1b output $C1_{max}$ and the Register 2a output $C2_{min}$. FIG. 4b illustrates that these output values are provided to a summing circuit 490, whose sum is provided to a shifter 495. The shifter 495 effectively implements a divide-by-2 operation. The summer 490 and the shifter 495 provide an average of the two middlemost points of the partially-sorted data sequence. This average may be considered the median of the input data sequence, and is the output of the median filter 420.

Averaging the two middlemost points, as done by the summer 490 and shifter 495 of FIG. 4b, represents a preferred embodiment when the median filter 420 is operating on an even number of input samples. In an alternative sub-embodiment, one of the two middlemost data values, e.g., $C1_{max}$, may be chosen as the median value. In other alternative sub-embodiments, an odd number of input data values may be provided to a median filter. For such sub-embodiments, a middlemost value of a sorted sequence may be directly produced without averaging two values or choosing from two values. It should be understood that, while the median filtering techniques are described herein for examples having an even number of data values within an input data sequence, similar techniques may be used to handle an example in which an input data sequence has an odd number of data values. For such an example, the number of comparators and multiplexors would be $$\frac{w+1}{2},$$

and registers would De needed for each of the comparator outputs, i.e., w+1 registers would be needed. Furthermore, a last phase is typically not omitted for such a sub-embodiment in which there is an odd number of input data values.

A particular sequence of phases will now be explained for the sorting circuit 420a of FIG. 4a, in conjunction with the routings illustrated in Table 2.

TABLE 2

Multiplexor Routings for Different Phases

| Comparator | Multiplexor | Phase 0 | Phase 1 | Phase 2 | Phase 3 | Phase 4 |
|---|---|---|---|---|---|---|
| 0 | M0a Output | $X_0$ | $C0_{min}$ | $C0_{min}$ | | |
|   | M0b Output | $X_1$ | $C1_{min}$ | $C2_{min}$ | | |
| 1 | M1a Output | $X_2$ | $C0_{max}$ | $C1_{min}$ | $C1_{min}$ | $C2_{min}$ |
|   | M1b Output | $X_3$ | $C1_{max}$ | $C0_{max}$ | $C2_{min}$ | $C0_{max}$ |
| 2 | M2a Output | $X_4$ | $C2_{min}$ | $C3_{min}$ | $C1_{max}$ | $C3_{min}$ |
|   | M2b Output | $X_5$ | $C3_{min}$ | $C2_{max}$ | $C2_{max}$ | $C1_{max}$ |
| 3 | M3a Output | $X_6$ | $C2_{max}$ | $C1_{max}$ | | |
|   | M3b Output | $X_7$ | $C3_{max}$ | $C3_{max}$ | | |

For the initial Phase 0, the sequencer 422 sets the multiplexors such that they route the input data values $x_0 \ldots x_7$ to the comparator inputs. The comparators each compare their inputs and produce ordered data value couples. These ordered data value couples are latched into the Registers 0a, 0b, . . . 3b. A clock edge occurring after the comparisons are finished is used to latch the data values into the registers. At the end of phase 0, Register 0a contains $C0_{min}=\min(x_0, x_1)$, Register 0b contains $C0_{max}=\max(x_0, x_1)$, Register 1a contains $C1_{min}=\min(x_2, x_3)$, Register 1b contains $C1_{max}=\max(x_2, x_3)$, etc.

At the beginning of phase 1, the sequencer 422 changes the control signals S0a, S0b, . . . S3b to change the routings of the multiplexors. MUX M0a is configured to route the Register 0a output $C0_{min}$ to input a of Comparator 0. MUX 0b is configured to route the Register 1a output $C1_{min}$ to input b of Comparator 0. As detailed in Table 2, the other multiplexors are similarly controlled by the sequencer 422 to route data values from the register outputs to comparator inputs. Once these routings are set, the comparators compare their respective inputs, and provide minimum and maximum values at their outputs. The resultant data is then latched into the registers in preparation for the next phase.

This process continues with phase 2, which includes 4 comparisons as in phase 1. The multiplexors are routed as shown in Table 2.

As shown in Table 2, Comparators 0 and 3 are not used during phases 3 and 4. They may be disabled during these phases, and the registers coupled to their outputs simply not latched. Alternatively, the registers may continue to be latched with the same data routed through them.

Implementation of a phase 5, as shown in the even-odd merge network 340 of FIG. 3, could be accomplished in a sorting circuit similar to that shown in FIG. 4a, via additional registers, the addition of another comparator, or additional multiplexor inputs.

The embodiment described above uses multiplexors having minimal numbers of inputs. While this leads to smaller multiplexors, and associated small die allocation for the multiplexors, the multiplexors may not readily be controlled by a common control signal. As illustrated in FIG. 4a, separate control signals S0a, S0b, S3b are generated by the sequencer 422 and provided to each of the multiplexors. There is some symmetry evident in Table 1, which can be taken advantage of to re-use some of the control signals. For example, the same control signals could be used for the control signals S0a, S3b provided to MUX M0a and MUX M3b. However, the topology illustrated in FIG. 4a does not readily support a common selection control signal for all of the multiplexors.

Figure 5:
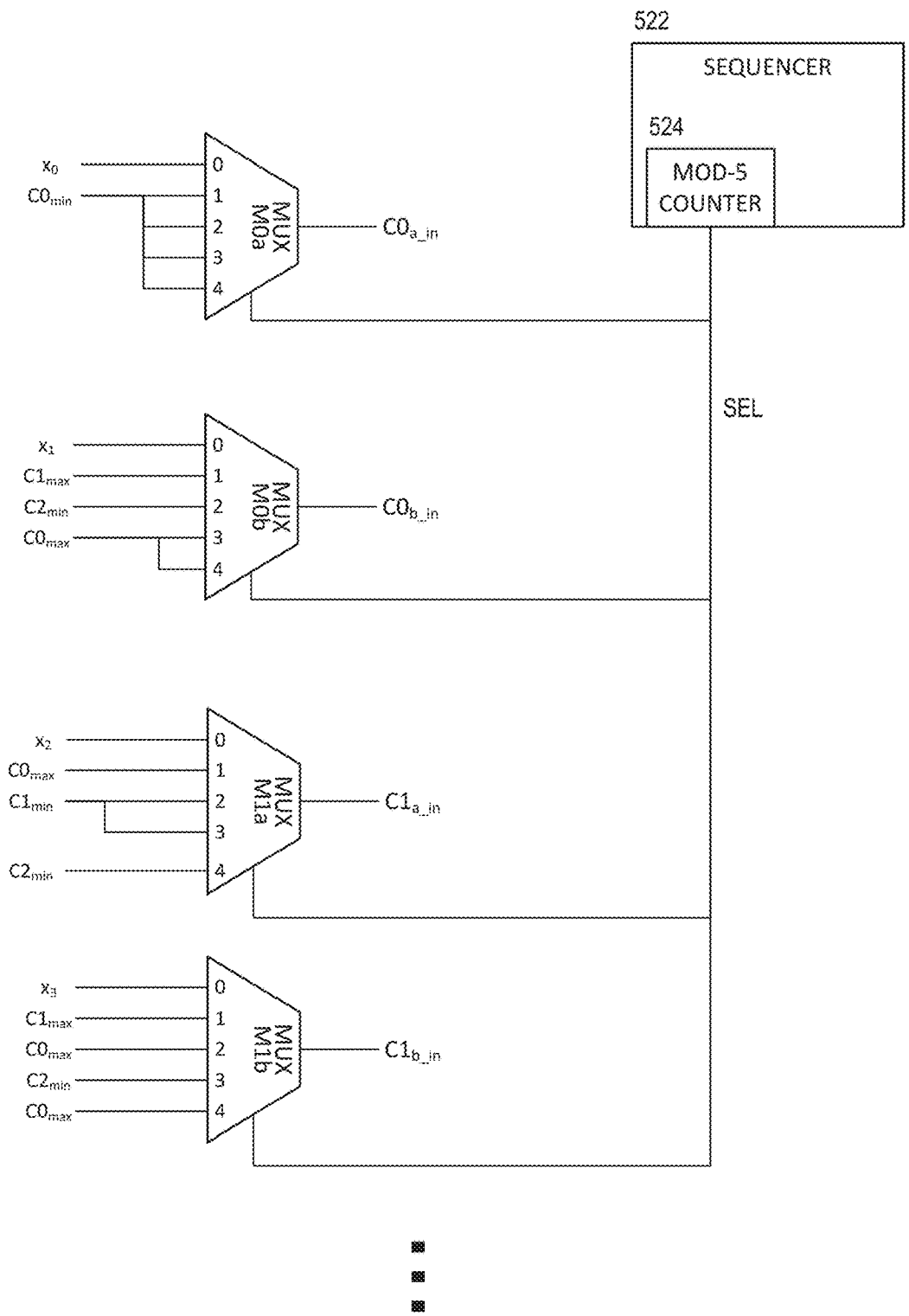
FIG. 5 illustrates an alternative embodiment of a sequencer and alternative multiplexor topologies, as may be used in a sorting circuit that re-uses comparators during the sorting of input data values

FIG. 5 illustrates an alternative embodiment in which the multiplexors MUX M0a, MUX M0b . . . MUX M3b are controlled by a common control signal SEL generated by a sequencer 522. For ease of illustration and to avoid repetition, only the sequencer 522 and the 4 multiplexors MUX M0a, MUX M0b, MUX M1a, MUX M1b are shown. The remaining multiplexors MUX M2a, MUX M2b, MUX M1a, MUX M3b are configured and connected in a similar manner to those multiplexors that are illustrated. The components of the sorting circuit 520 that are not illustrated in FIG. 5, e.g., comparators and registers, may be presumed the same as shown in FIG. 4a.

The illustrated multiplexors each have 5 inputs. While the resultant multiplexors are larger than those of the sorting circuit 420a illustrated in FIG. 4, the sorting circuit 520 of FIG. 5 is simplified relative to that of FIG. 4 in other ways. Notably, a common control signal SEL may be generated by the sequencer 522 and used to control all of the multiplexors, thereby reducing the number of required electrical connections and simplifying the control signal generation logic within the sequencer 522. The control signal generation logic of the sequencer 522 may be implemented as a finite state machine. The illustrated sequencer 522 of FIG. 5 includes a MOD-5 counter 524 that is used to generate the control signal SEL. The count provided by this counter 524 can, if the multiplexor inputs are appropriately arranged, cycle through the multiplexor inputs 0 . . . 5 of each multiplexor MUX M0a, MUX M0b, MUX M1a, MUX M1b, MUX M2a, MUX M2b, MUX M3a, MUX M3b.

Figure 6:
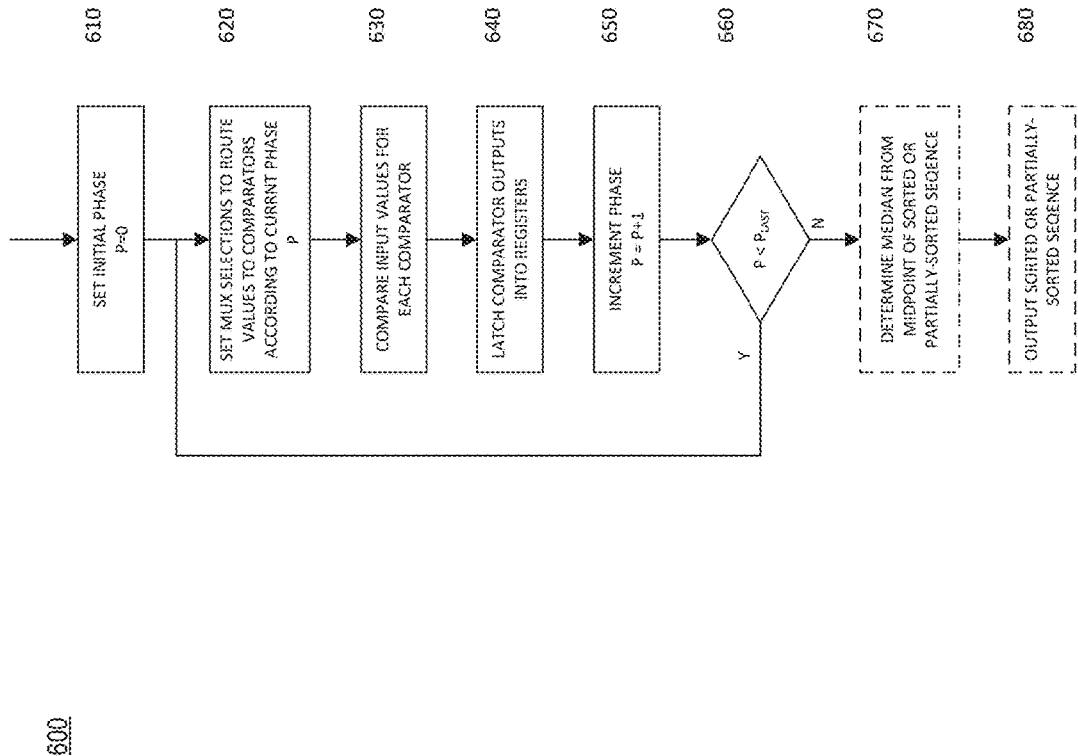
FIG. 6 illustrates a method, within a sorting circuit, for controlling multiplexors to re-use comparators in the sorting of input data values.

FIG. 6 illustrates an embodiment of a method 600 for sorting input data values and/or performing median filtering. The method 600 may be implemented within a median filter or a sorting circuit, such as those illustrated in FIGS. 4a and 4b, or FIG. 5. The input sequence of data samples may be taken from a shift register, such as the shift register 130 of FIG. 1, which implements a sliding window over a larger sequence of input data samples. For such a scenario, the method 600 will typically be repeated for each new data sample that is shifted into the shift register, or for each block of input data samples that are shifted into the shift register. While the sorting of an input sequence of data samples may be considered a side effect of a median filtering operation, it should also be appreciated that the sorting itself may be the primary goal of the techniques, in which case the determination of a median value is not needed.

In a first step, the phase is initialized 610, e.g., P=0. Next, the multiplexor selection control signals are set 620 so as to route multiplexor input data values to comparator inputs according to the current phase P. With appropriate comparator inputs so routed, each comparator then compares 630 its input values and provides the minimum and maximum of these input values at a minimum output and a maximum output. Registers coupled to the comparator outputs latch 640 the data values provided at the comparator outputs. This may be responsive to a clock edge provided to the register clock inputs. The phase P is then incremented 650 and checked 660 to see if the phase is the last required phase $P_{LAST}$. If not, then the method continues at the step of setting 620 the multiplexor control selection signals. Otherwise, the method proceeds to determine 670 a median value from a midpoint of the sorted or partially sorted sequence that is stored in the registers. (The determination 670 of the a median value is shown as optional, as it may not be needed if the primary purpose of the method is to provide a sorted sequence.)

If the method 600 is being used primarily for median filtering, then a partially sorted sequence may be adequate. If the method is being used to generate a sorted sequence, a fully sorted sequence may be required. In an optional step 680, a sorted or partially-sorted sequence is output. Note that the partially-sorted sequence implicitly includes a median value. Note that the setting of the last phase $P_{LAST}$ may be dependent upon whether a complete sorting is needed. For a complete sorting, the last phase $P_{LAST}$ will typically be one greater than the last phase $P_{LAST}$ that is used when performing median filtering and a partial sorting.

Figure 7:
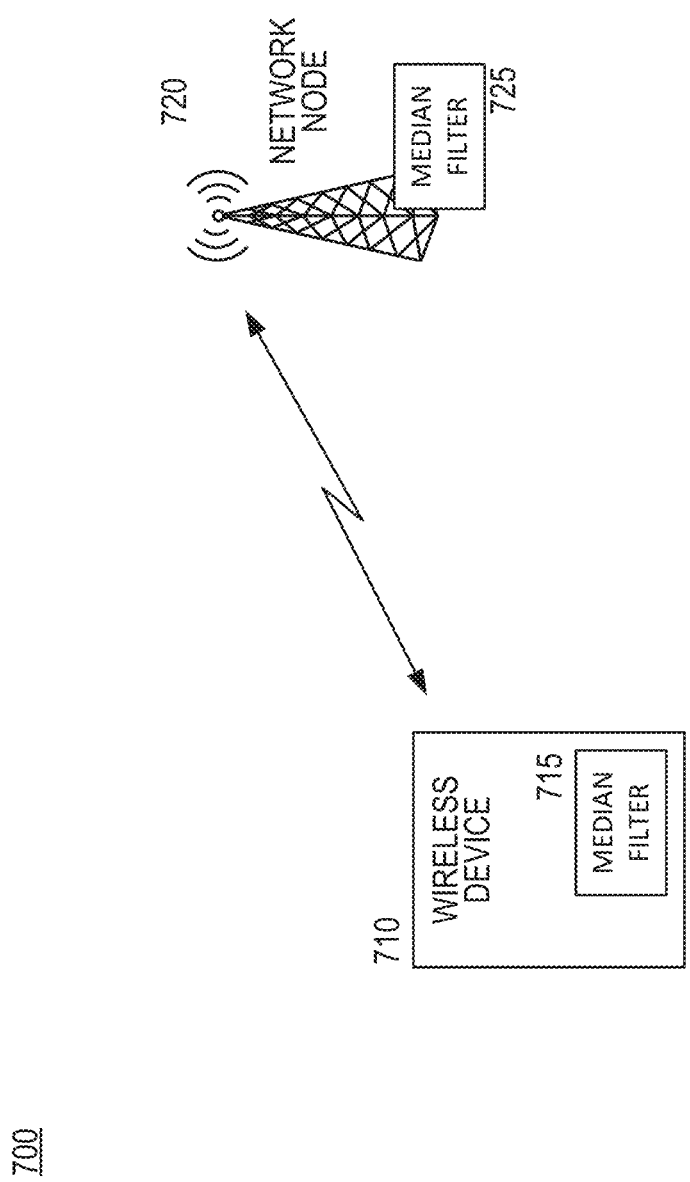
FIG. 7 illustrates a wireless communications system having wireless devices and network nodes, each of which may use median filters as described herein.

FIG. 7 illustrates a wireless communications system 700 in which the median filter described previously may be used. This wireless system 700 includes one or more wireless devices 710 and one or more network nodes 720. The wireless device 710 may be a user equipment (UE), mobile terminal, machine-type communication (MTC) device, cellular phone, laptop computer, etc. The wireless device 710 communicates using radio frequencies with a network node 720. The wireless device 710 includes a median filter 715 that is implemented using the techniques described herein, e.g., as described in conjunction with FIGS. 4a, 4b, 5, and 6. The wireless device 710 may include a variety of sensors, such as an accelerometer, magnetometer, gyroscope, thermometer, barometer, proximity sensor, or light sensor. Any of these or other sensors tend to produce noisy sensor signals, which often need to be filtered. The nonlinear median filter 715, which uses the techniques described herein, is appropriate for such sensor signal filtering in many cases.

The wireless device 710 typically includes a display and audio input/output devices. Images presented to the display may benefit from being processed using the median filter 715. Furthermore, audio signals, e.g., the speech audio input to the microphone of the wireless device 710, often requires a variety of filtering, which may be implemented using the median filter 715.

The wireless device 710 also includes components such as a receiver, transmitter, modulator, demodulator for communicating wirelessly with the network node 720. Such components are well-known, generally, within the field of wireless communication and will not be described in detail herein. Such components include filters, e.g., band select filters within a receiver, and transmit suppression filters to prevent out-of-band radio frequency (RF) emissions at a transmitter. These filters could advantageously be implemented using the median filter 715.

The network node 720 may be a radio base station, which is wirelessly communicating with the wireless device 710. The network node 720 includes a median filter 725, which uses the techniques described herein. A radio base station includes components similar to the wireless device 710 for communicating wirelessly, e.g., a receiver, transmitter, modulator, and demodulator. The median filter 725 may be used for purposes similar to those described for the median filter 715 of the wireless device 710.

Figure 8:
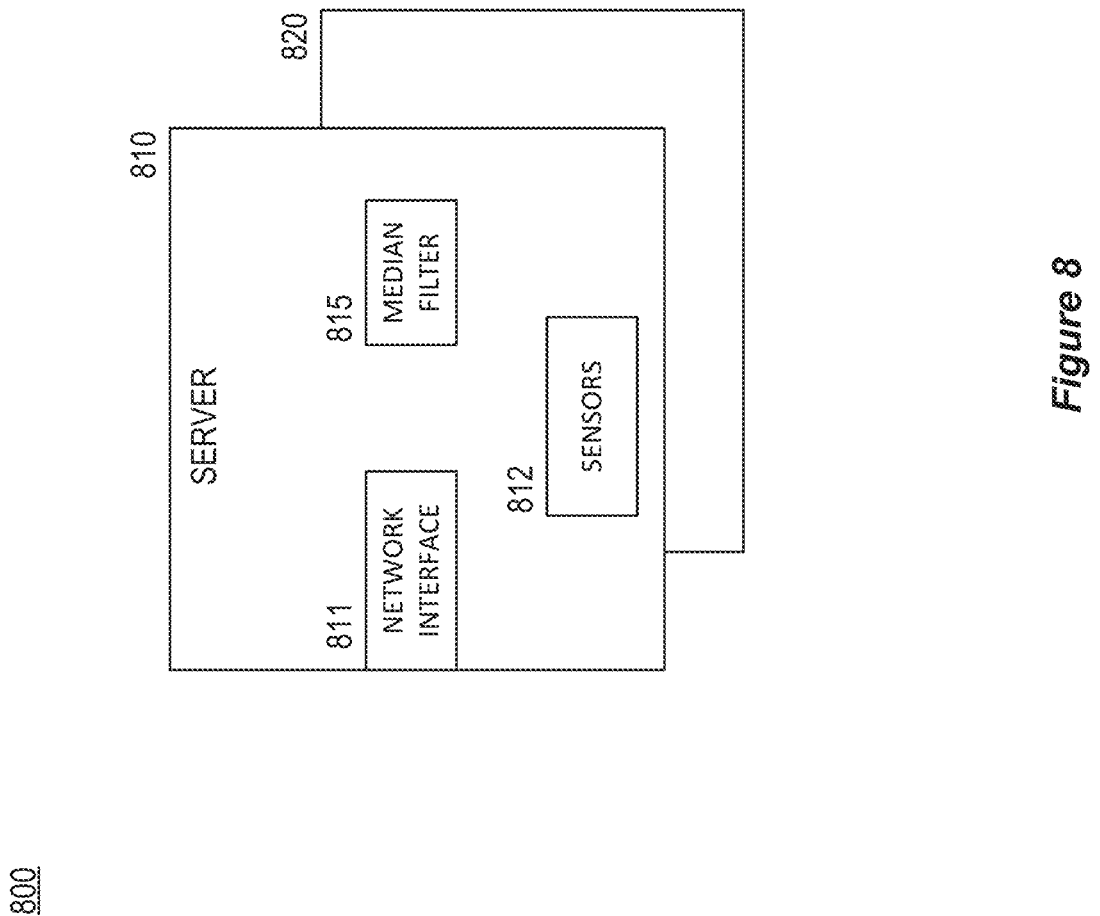
FIG. 8 illustrates a data center that may make use of the median filters described herein.

FIG. 8 illustrates a data center 800, which represents another application for median filtering. The data center 800 includes one or more servers 810, 820. The server 810 includes a median filter 815, that is implemented using the techniques described above. The median filter 815 may be used for sorting or filtering data that is input to the server using a network interface 811. The median filter 815 may be helpful when sorting vast amounts of data, e.g., as required in the processing of so-called "big data," that may be provided to the server 810 via the network interface 811. Additionally, the server 810 may have sensors 812 required by its own operation. For example, temperature sensors may be used for temperature control of the server 810 or to control the speed of processors or other circuitry within the server 810. The median filter 815 may be used to filter the output of such a temperature sensor or other sensors 812.

As used herein, the terms "having", "containing" "including", "comprising" and the like are open-ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A sorting circuit for sorting input data values, the sorting circuit comprising:
a plurality of comparators, each comparator being operable to compare two comparator data values input at a first comparator input and a second comparator input, and produce a minimum of the two comparator data values at a first comparator output and a maximum of the two comparator data values at a second comparator output;
a plurality of multiplexors, each multiplexor having:
a plurality of multiplexor data inputs, wherein each multiplexor data input is coupled to one of the comparator outputs of one of the comparators or to one of the input data values of the sorting circuit,
a multiplexor output coupled to the first comparator input or the second comparator input of one of the comparators, so as to route one of the multiplexor inputs to the first comparator input or the second comparator input of said one of the comparators, and
a multiplexor selection input operable to determine which of the multiplexor data inputs is routed to the multiplexor output; and
a scheduling circuit configured to generate, for each of multiple sorting phases, control signals that are coupled to the multiplexor selection inputs of the plurality of multiplexors, so as to route the comparator outputs or the input data values during one sorting phase to the comparator inputs for a next sorting phase, to implement a known sorting algorithm and produce a median value corresponding to a window of the input data values.

2. The sorting circuit of claim 1, wherein the scheduling circuit is further configured such that the generated control signals produce data values, at the multiplexor outputs or at the comparator outputs, that are arranged in a sorted sequence, the sorted sequence comprising the input data values from the window of the input data values arranged in a monotonically increasing order or a monotonically decreasing order.

3. The sorting circuit of claim 1, wherein the window of the input data values comprises an even number of data values, and the produced median value is one of two input data values that are closest to a midpoint of a sorted sequence of the input data values within the window, or is an average of the two input data values that are closest to the midpoint of the sorted sequence of the input data values within the window.

4. The sorting circuit of claim 1, further comprising:
a plurality of data registers, each data register having an input coupled to an output of one of the plurality of comparators and having an output coupled to an input of one of the plurality of multiplexors.

5. The sorting circuit of claim 4, wherein data is latched into each of the plurality of data registers at a first frequency, and wherein the scheduling circuit is further configured to change its generated control signals at the first frequency.

6. The sorting circuit of claim 1, wherein the number of comparators is fewer than the number of input data values within the window.

7. The sorting circuit of claim 1, wherein the number of comparators is one half of the number of input data values within the window, or one more than one half of the number of input data values within the window.

8. The sorting circuit of claim 1, wherein the scheduling circuit comprises a modulus-P counter configured to generate the control signals, wherein P is a number of sorting phases.

9. The sorting circuit of claim 1, wherein the sorting circuit is part of a median filter.

10. The sorting circuit of claim 1, wherein the sorting circuit further comprises:
a shift register comprising a window size of sample registers for storing the input data values, each sample register operable to store one of the input data values, the shift register thereby storing the window size of the input data values on which the sorting algorithm is implemented and the median value is produced.

11. The sorting circuit of claim 10, wherein the scheduling circuit is configured to produce a new median value for each input data value that is shifted into the shift register.

12. The sorting circuit of claim 10, wherein the scheduling circuit is configured to produce a new median value for each block of input data values that is shifted into the shift register, wherein the block comprises a plurality of input data values.

13. A method for sorting input data values within a sorting circuit comprised of a plurality of comparators, a plurality of multiplexors, and a sequencer, the method comprising:
inputting a sequence of input data values;
generating control signals that are coupled to multiplexor selection inputs of the plurality of multiplexors;
routing, for each of the plurality of multiplexors, a selected multiplexor data input from a plurality of multiplexor data inputs for the multiplexor to a multiplexor output that is coupled to an input of one of the plurality of comparators, wherein the selected multiplexor data input is selected according to the multiplexor selection input for the multiplexor, and wherein the multiplexor data inputs are provided with data values taken from the sequence of input data values or from outputs of the plurality of comparators;
comparing, for each of the plurality of comparators, two comparator input data values, each of which is provided from the multiplexor output of one of the plurality of multiplexors, and producing a minimum of the two comparator input data values at a first comparator output and a maximum of the two comparator input data values at a second comparator output;
providing, for each of the plurality of comparators, the first comparator output to one of the multiplexor data inputs for one of the plurality of multiplexors, and the second comparator output to one of the multiplexor data inputs for one of the plurality of multiplexors;
repeating the steps of generating, routing, comparing, and providing for each of multiple phases, so as to implement a known sorting algorithm; and
producing a median value of the sequence of input data values.

14. The method of claim 13, further comprising:
producing a sorted sequence that includes data values from the sequence of input data values arranged in a monotonically increasing order or a monotonically decreasing order.

15. The method of claim 13, wherein the sequence of input data values comprises an even number of data values, and the produced median value is one of two input data values that are closest to a midpoint of a sorted sequence of the input data values, or is an average of the two input data values that are closest to the midpoint of the sorted sequence of the input data values.

16. The method of claim 13, wherein the providing comprises:
latching, for each of the plurality of comparators, the first comparator output into an input of a first register and the second comparator output into an input of a second register, wherein an output of the first register is coupled to one of the multiplexor data inputs for one of the plurality of multiplexors, and wherein an output of the second register is coupled to one of the multiplexor data inputs for one of the plurality of multiplexors.

17. The method of claim 16, wherein data is latched into the first register and the second register, corresponding to at least one of the plurality of comparators, at a first frequency, and wherein the generated control signals are changed at the first frequency.

18. The method of claim 13, wherein the number of comparators within the plurality of comparators is fewer than the number of data values within the sequence of input data values.

19. The method of claim 13, wherein the generated control signal is a count corresponding to a current sorting phase.

* * * * *